United States Patent
Gao et al.

(10) Patent No.: US 11,243,987 B2
(45) Date of Patent: Feb. 8, 2022

(54) EFFICIENT MERGING AND FILTERING OF HIGH-VOLUME METRICS

(71) Applicant: Microsoft Technology Licensing, LLC, Redmond, WA (US)

(72) Inventors: Wenxuan Gao, Santa Clara, CA (US); Bin Wu, Palo Alto, CA (US); Weiqin Ma, San Jose, CA (US); Weidong Zhang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1101 days.

(21) Appl. No.: 15/184,039

(22) Filed: Jun. 16, 2016

(65) Prior Publication Data
US 2017/0364563 A1    Dec. 21, 2017

(51) Int. Cl.
*G06F 16/28* (2019.01)
*G06F 7/16* (2006.01)
*G06F 16/248* (2019.01)
*G06F 16/22* (2019.01)

(52) U.S. Cl.
CPC .............. *G06F 16/288* (2019.01); *G06F 7/16* (2013.01); *G06F 16/2228* (2019.01); *G06F 16/248* (2019.01)

(58) Field of Classification Search
CPC .............. G06F 16/2228; G06F 16/24; G06F 16/24575; G06F 16/288; G06F 16/248; G06F 7/16; G06F 16/2379
See application file for complete search history.

(56) References Cited

U.S. PATENT DOCUMENTS

| | | | |
|---|---|---|---|
| 5,745,894 A * | 4/1998 | Burrows | G06F 16/38 |
| 6,523,040 B1 * | 2/2003 | Lo | G06F 40/177 |
| 7,024,431 B1 | 4/2006 | Komelson et al. | |
| 8,527,544 B1 | 9/2013 | Colgrove | |
| 8,996,470 B1 * | 3/2015 | Hogue | G06F 11/28 707/687 |
| 2002/0059260 A1 | 5/2002 | Jas | |
| 2002/0198869 A1 * | 12/2002 | Barnett | G06F 16/951 |
| 2004/0193570 A1 * | 9/2004 | Yaeger | G06F 16/284 |

(Continued)

OTHER PUBLICATIONS

"Final Office Action Issued in U.S. Appl. No. 14/954,303", dated Jan. 29, 2019, 13 Pages.

(Continued)

*Primary Examiner* — Mariela Reyes
*Assistant Examiner* — Fatima P Mina
(74) *Attorney, Agent, or Firm* — NDWE, LLP

(57) ABSTRACT

The disclosed embodiments provide a system for processing data. During operation, the system obtains a set of records from a set of inputs, with each record containing an entity key, a partition key, and one or more attribute-value pairs. Next, the system sorts and indexes the records by the entity key for each partitioned input. The system then processes a query of the records by matching entity key values to the sorted and indexed records for each input partition in the query. Next, the system merges the subset of records with the same entity key values into records, with each merged record containing an entity key field and a single field that includes a list of attribute-value pairs from the subset. Finally, the system outputs the merged records in response to the query.

20 Claims, 7 Drawing Sheets

(56) References Cited

U.S. PATENT DOCUMENTS

| | | | |
|---|---|---|---|
| 2005/0219577 A1 | 10/2005 | Edge | |
| 2006/0173926 A1* | 8/2006 | Kornelson | G06F 16/258 |
| 2006/0224375 A1* | 10/2006 | Barnett | G06F 11/3495 |
| | | | 703/22 |
| 2007/0180085 A1* | 8/2007 | Barnett | G06Q 10/04 |
| | | | 709/223 |
| 2007/0198481 A1* | 8/2007 | Hogue | G06F 16/9566 |
| 2009/0119106 A1* | 5/2009 | Rajakumar | G06F 21/577 |
| | | | 704/246 |
| 2009/0222404 A1* | 9/2009 | Dolin | G06F 16/2452 |
| 2010/0106724 A1* | 4/2010 | Anderson | G06F 16/24544 |
| | | | 707/737 |
| 2011/0066522 A1* | 3/2011 | Kleinrock | G06Q 30/0633 |
| | | | 705/26.8 |
| 2011/0264993 A1* | 10/2011 | Leong | G06F 17/246 |
| | | | 715/217 |
| 2012/0215829 A1* | 8/2012 | Naphade | G06N 5/02 |
| | | | 709/203 |
| 2012/0311581 A1* | 12/2012 | Balmin | G06F 9/5066 |
| | | | 718/100 |
| 2013/0003965 A1* | 1/2013 | Wilkinson | G06F 16/215 |
| | | | 380/44 |
| 2013/0046949 A1* | 2/2013 | Colgrove | G06F 3/0608 |
| | | | 711/170 |
| 2013/0104251 A1 | 4/2013 | Moore | |
| 2013/0339366 A1* | 12/2013 | Khimich | G06F 16/28 |
| | | | 707/741 |
| 2014/0189483 A1 | 7/2014 | Awan et al. | |
| 2015/0269213 A1 | 9/2015 | Avati | |
| 2017/0154057 A1 | 6/2017 | Wu et al. | |
| 2017/0235786 A9 | 8/2017 | Faith | |
| 2017/0286551 A1 | 10/2017 | Wu | |

OTHER PUBLICATIONS

"Apache Hadoop 2.4.1", https://hadoop.apache.org/docs/r2.4.1/.
"Voice of the Customer", http://npd-solutions.com/voc.html.
"Voice of the Customer VoC Software & Programs Confirmit", https://www.confirmit.com/what-we-do/voice-of-the-customer/.
"Non Final Office Action Issued in U.S. Appl. No. 14/954,303", dated Jul. 6, 2018, 19 Pages.
"Non Final Office Action Issued in U.S. Appl. No. 15/136,502", dated Mar. 2, 2018, 21 Pages.
"Non Final Office Action Issued in U.S. Appl. No. 14/954,303", dated Dec. 30, 2019, 13 Pages.
"Final Office Action Issued in U.S. Appl. No. 14/954,303", dated Jul. 10, 2020, 15 Pages.

* cited by examiner

EFFICIENT MERGING AND FILTERING OF HIGH-VOLUME METRICS

RELATED APPLICATION

The subject matter of this application is related to the subject matter in a co-pending non-provisional application by inventors Bin Wu, Weiqin Ma, Qiang Zhu, Yuankui Sun, Yan Liu, Weidong Zhang and Hong Lu, entitled "Efficient Consolidation of High-Volume Metrics," having serial number 14/954,303, and filing date Nov. 30, 2015.

BACKGROUND

Field

The disclosed embodiments relate to data analysis. More specifically, the disclosed embodiments relate to techniques for efficiently merging and filtering high-volume metrics for data analysis.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools, relational databases, and/or storage mechanisms may be unable to handle petabytes or exabytes of loosely structured data that is generated on a daily and/or continuous basis from multiple, heterogeneous sources. Instead, management and processing of "big data" may require massively parallel software running on a large number of physical servers. In addition, big data analytics may be associated with a tradeoff between performance and memory consumption, in which compressed data takes up less storage space but is associated with greater latency, and uncompressed data occupies more memory but can be analyzed and/or queried more quickly.

Consequently, big data analytics may be facilitated by mechanisms for efficiently collecting, storing, managing, compressing, transferring, sharing, analyzing, and/or visualizing large data sets.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
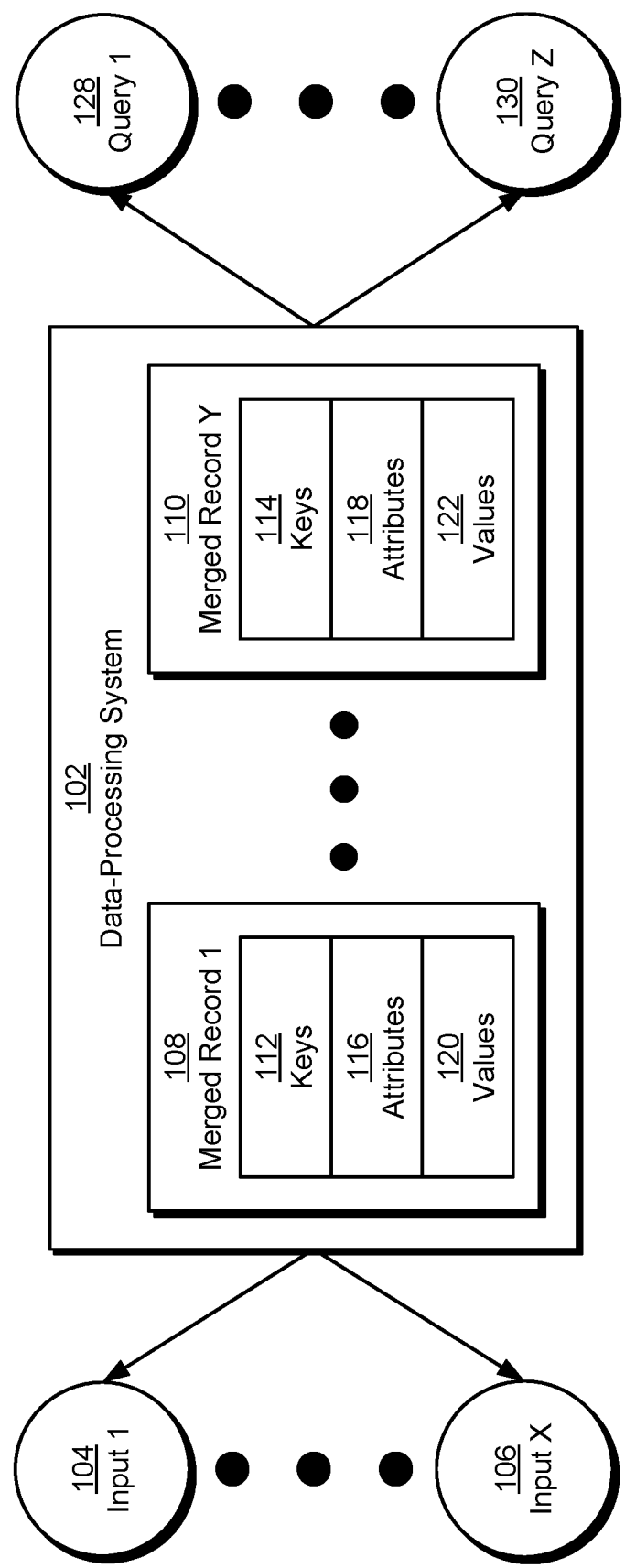
FIG. 1 shows a schematic of a system in accordance with the disclosed embodiments.

The disclosed embodiments provide a method, apparatus, and system for processing data. As shown in FIG. 1, the system may be a data-processing system 102 that collects data from a set of inputs (e.g., input 1 104, input x 106) and generates a set of merged records (e.g., merged record 1 108, merged record y 110) from the data. For example, data-processing system 102 may generate merged records from events, purchases, sensor data, user activity, anomalies, faults, failures, and/or other data points provided by the inputs, which may provide their data from various locations.

More specifically, data-processing system 102 may consolidate data from multiple inputs into the merged records. The inputs may represent different sources of metrics, dimensions, and/or other parameters that are generated, calculated, measured, and/or otherwise obtained by different groups, statistical models, monitoring mechanisms, and/or analytics systems. Data-processing system 102 may collect the parameters from the inputs and merge the parameters into the records, thus providing a centralized location for storing and accessing the parameters.

Data-processing system 102 may then provide the merged records for use with queries (e.g., query 1 128, query z 130) associated with the data. For example, data-processing system 102 may enable analytics queries that are used to discover relationships, patterns, and/or trends in the data; gain insights from the data; and/or guide decisions and/or actions related to attributes 116-118 and/or values 120-122. In other words, data-processing system 102 may include functionality to support the efficient collection, storage, processing, and/or querying of big data.

As shown in FIG. 1, merged records generated by data-processing system 102 may include keys 112-114, attributes 116-118, and values 120-122. Attributes 116-118 and values 120-122 may define the parameters (e.g., metrics, dimensions, etc.) that have been measured, calculated, and/or collected by the teams, models, and/or systems represented by the inputs. For example, attributes 116-118 and values 120-122 may be specified in attribute-value pairs, in which the attribute of each attribute-value pair represents the name of a given parameter and the value in the attribute-value pair represents the value of the parameter.

In one or more embodiments, metrics and dimensions represented by attributes 116-118 and values 120-122 are associated with user activity at an online professional network. The online professional network may allow users to establish and maintain professional connections, list work and community experience, endorse and/or recommend one another, search and apply for jobs, and/or engage in other activity. Employers may list jobs, search for potential candidates, and/or provide business-related updates to users. As a result, the metrics may track values such as dollar amounts spent, impressions of ads or job postings, clicks on ads or job postings, profile views, messages, job or ad conversions within the online professional network, and/or other user behaviors, preferences, or propensities. In turn, the dimensions may describe attributes of the users and/or events from which the metrics are obtained. For example, the dimensions may include the users' industries, titles, seniority levels, employers, skills, and/or locations. The dimensions may also include identifiers for the ads, jobs, profiles, pages, and/or employers associated with content viewed and/or transmitted in the events. The metrics and dimensions may thus facilitate understanding and use of the online professional network by advertisers, employers, and/or other members of the online professional network.

Keys 112-114 may be used by data-processing system 102 to group parameters from multiple inputs into the merged records. Each row of data from an input may include one or more required keys, such as an entity key that represents an entity (e.g., member or company) in the online professional network and a partition key that represents a given partition (e.g., time interval, location, demographic, etc.) associated with the data. In turn, rows from disparate inputs with the same entity key and partition key may be aggregated into a single merged record by data-processing system 102.

In one or more embodiments, data-processing system 102 includes functionality to consolidate, merge, and filter data from the inputs in an efficient, flexible, scalable, and timely manner. As described in further detail below, the data-processing system may enable on-the-fly loading of records from various inputs into the merged records. Such loading may be applied to pre-processed data sets containing records that have been sorted, indexed, and/or partitioned by one or more keys 112-114. Moreover, custom data sets containing the merged records may be generated by filtering attributes 116-118 and values 120-122 from the records and/or trimming records associated with different keys may be performed during the loading process. Consequently, data-processing system 102 may support efficient and flexible collection, processing, consolidation, and filtering of data for big data analytics.

Figure 2:
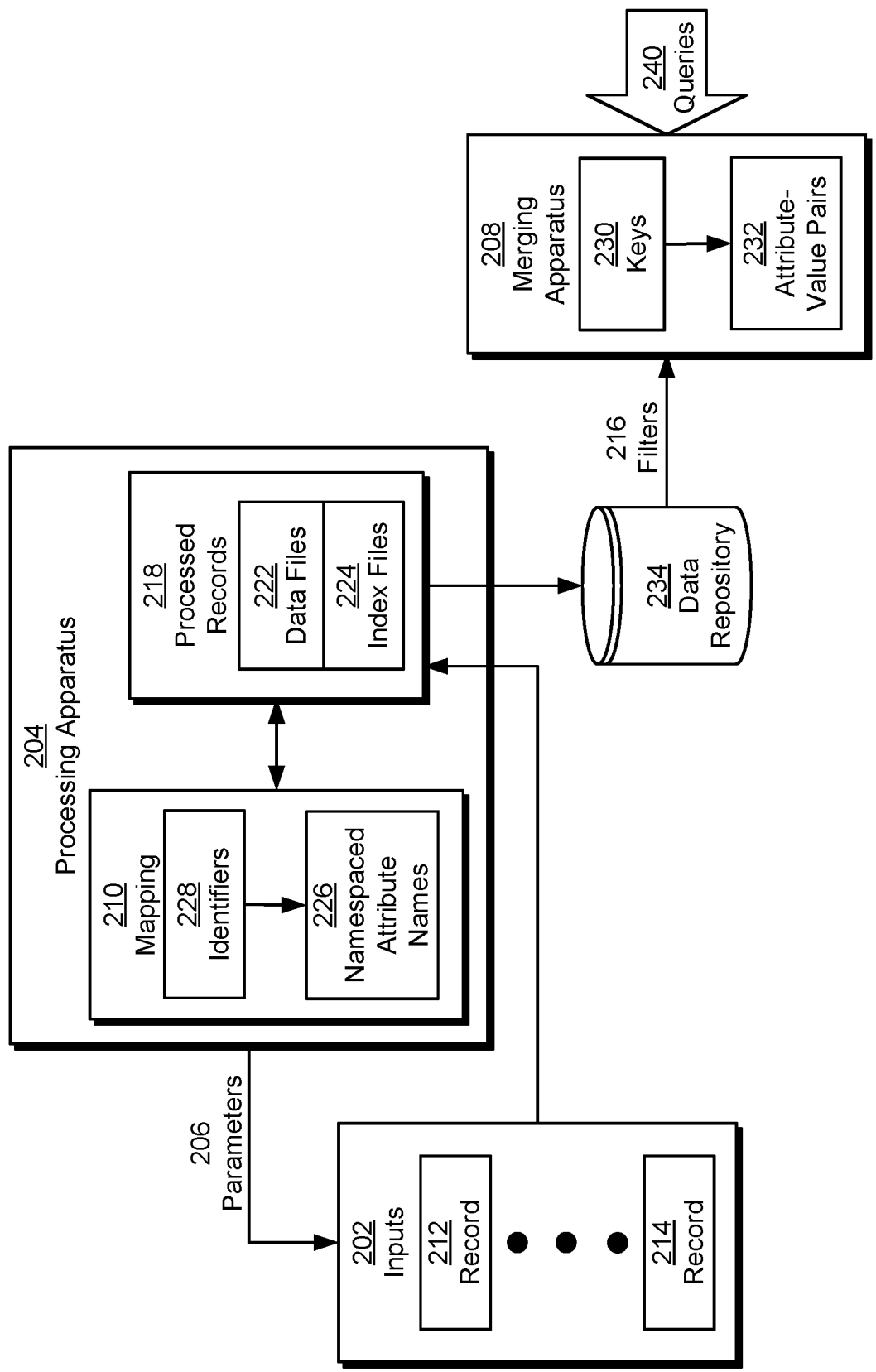
FIG. 2 shows a system for processing data in accordance with the disclosed embodiments.

FIG. 2 shows a system for processing data (e.g., data-processing system 102 of FIG. 1) in accordance with the disclosed embodiments. The system includes a processing apparatus 204 and a merging apparatus 208. Each of these components is described in further detail below.

Processing apparatus 204 may obtain a set of records 212-214 from a set of inputs 202. For example, processing apparatus 204 may retrieve records 212-214 from multiple locations in a distributed filesystem, cluster, and/or other network-based storage. To load records 212-214 from inputs 202, processing apparatus 204 may obtain one or more parameters 206 containing the names and/or locations of the inputs. For example, the processing apparatus may obtain a configuration file that specifies a name and a path for each input source of data records 212-214 to be consolidated into one or more merged records. In another example, the processing apparatus may provide an application-programming interface (API) for receiving the parameters and/or one or more queries 240 containing the parameters from one or more users. Because inputs 202 to processing apparatus 204 are dynamically added, removed, or updated by changing parameters 206, changes to the set of inputs 202 may be easier to apply than data-processing mechanisms that use hard-coded or static scripts to retrieve data from input sources.

In one or more embodiments, each record 212-214 includes an entity key, a partition key, and one or more attribute-value pairs (e.g., attribute-value pairs 232). The entity key may represent an entity associated with the record, such as a user, company, business unit, product, advertising campaign, and/or experiment. The partition key may represent a time interval (e.g., hour, day, etc.), location, demographic, and/or other logical or physical partition for the record.

The attribute-value pairs in the record may represent metrics, dimensions, and/or other types of data associated with the entity and partition. More specifically, the attribute-value pairs may be identified by attribute names and the corresponding values associated with the attribute names. For example, attribute-value pairs in a record of weekly user interaction with an online professional network may include attribute names such as "page_view_weekly", "search_weekly", and "invitation_weekly", and values of these attributes may represent weekly page views, searches, and/or connection invitations, respectively, for a user represented by the entity key in the record. In other words, the attribute-value pairs of a record may be atomic data points that can be measured, discerned, and/or otherwise determined for a given entity and partition associated with the record.

In addition, each input may be associated with one or more schemas that describe the structure of data from the input. For example, an input named "abook_snapshot" may include the following schema:

```
{
    "type" : "record",
    "fields" : [ {
        "name" : "member_sk",
        "type" : [ "null", "long" ]
    }, {
```

```
            "name" : "date_sk",
            "type" : [ "null", "string" ]
        }, {
            "name" : "imported_contacts",
            "type" : [ "null", "long" ]
        }, {
            "name" : "imported_contacts_107d",
            "type" : [ "null", "long" ]
        }, {
            "name" : "imported_contacts_130d",
            "type" : [ "null", "long" ]
        }, {
            "name" : "is_uploaded_abook_107d",
            "type" : [ "null", "long" ]
        }, {
            "name" : "is_uploaded_abook_130d",
            "type" : [ "null", "long" ]
        }, {
            "name" : "is_uploaded_abook_190d",
            "type" : [ "null", "long" ]
        } ]
    }
```

The exemplary schema above specifies that records from the "abook_snapshot" input include an entity key named "member_sk" and a partition key named "date_sk". The schema also includes a list of attribute-value pairs with attribute names of "imported_contacts", "imported_contacts_107*d*", "imported_contacts_130*d*", "is_uploaded_abook_107*d*", "is_uploaded_abook_130*d*", and "is_uploaded_abook_190*d*" and values that are of type "null" or "long".

Next, processing apparatus 204 may convert records 212-214 into a set of processed records 218 that are stored in a number of data files 222. More specifically, processing apparatus 204 may partition records with different partition keys or partition key ranges from a given input into separate data files and sort the records in the data file by the entity key. For example, the processing apparatus may partition the records in a data set so that records from a given day are stored, in ascending order of entity key, in the same data file.

To reduce the size of data files 222, processing apparatus 204 may omit attribute-value pairs with non-meaningful values from processed records 218. For example, processing apparatus 204 may apply one or more filters to exclude attribute-value pairs with null values, zero numeric values for numeric data types, and/or other types of "default" values from the filtered records.

Processing apparatus 204 may also modify attribute-value pairs in data files 222 in a way that facilitates efficient identification and storage of the attribute-value pairs. First, the processing apparatus may generate unique, namespaced attribute names 226 for attributes in processed records 218 by adding the input name of the input from which each attribute-value pair was received to the attribute name of the attribute. Such concatenation of input names with attributes names may be used to distinguish between attribute-value pairs with the same attribute names from different inputs. Continuing with the exemplary schema above, processing apparatus 204 may append the input name of "abook_snapshot" to the attribute name of "imported_contacts" to produce a namespaced attribute name of "abook_snapshot, imported_contacts" for all attribute-value pairs with the attribute name from the input. The namespaced attribute name may uniquely identify the attribute-value pairs from the input, even when other inputs have records with attribute names of "imported_contacts".

Next, processing apparatus 204 may generate a mapping 210 of a set of unique identifiers 228 to namespaced attribute names 226 and replace the attribute names in processed records 218 with the corresponding identifiers 228 from mapping 210. With reference to the "abook_snapshot" input above, the processing apparatus may produce the following exemplary mapping 210 of identifiers 228 to namespaced attribute names 226:

```
1, abook_snapshot,imported_contacts, long, 0
2, abook_snapshot,imported_contacts_107d, long, 0
3, abook_snapshot,imported_contacts_130d, long, 0
4, abook_snapshot,is_uploaded_abook_107d, long, 0
5, abook_snapshot,is_uploaded_abook_130d, long, 0
6, abook_snapshot,is_uploaded_abook_190d, long, 0
```

In the mapping above, a numeric (e.g., integer) identifier is followed by the namespace, attribute name, data type, and default value represented by the identifier. For example, the numeric identifier of "1" is mapped to the namespaced attribute name of "abook_snapshot,imported_contacts", a data type of "long", and a default value of "0".

In turn, processing apparatus 204 may replace all instances of a given attribute name from the "abook_snapshot" input in attribute-value pairs of processed records 218 with the corresponding numeric identifiers, thus reducing the amount of space required to store the processed records. For example, the processing apparatus may use the exemplary mapping 210 above to produce the following exemplary processed record:

```
    {
        "member_sk" : 1302,
        "date_sk" : "2016-02-27",
        "metrics" : [ {
            "metrics_id" : 1,
            "metrics_value" : "4335"
        }, {
            "metrics_id" : 3,
            "metrics_value" : "988"
        }, {
            "metrics_id" : 5,
            "metrics_value" : "1"
        }, {
            "metrics_id" : 6,
            "metrics_value" : "1"
        } ]
    }
```

The exemplary processed record may include an entity key (i.e., "member_sk") of 1302 and a partition key (i.e., "date_sk") of "2016-02-27". The entity and partition keys are followed by four attribute-value pairs (i.e., "metrics") in an array, with elements of the array containing attribute-value pairs with numeric identifiers of 1, 3, 5 and 6, which respectively represent the namespaced attribute names of "abook_snapshot,imported_contacts", "abook_snapshot, imported_contacts_130*d*", "abook_snapshot, is_uploaded_abook_130*d*", and "abook_snapshot, is_uploaded_abook_190*d*".

Processing apparatus 204 may also index the sorted records of each data file in an index file (e.g., index files 224) for the data file. For example, processing apparatus 204 may index the records by entity key using attribute-value pairs, with each attribute representing an entity key and the corresponding value representing the location (e.g., offset) of the record with the entity key in the data file. Entity keys and the corresponding record locations in the data file may also be specified in the index file at periodic intervals (e.g., every 1000 records). By including an index with processed records 218, processing apparatus 204 may enable constant-time retrieval of records from data files 222.

Processing apparatus 204 may store data files 222, index files 224, and mapping 210 in a data repository 234 such as a distributed filesystem, network-attached storage (NAS), and/or other type of network-accessible storage, for subsequent retrieval and use. For example, processing apparatus 204 may store mapping 210 in one or more text files and data files 222 and/or index files 224 in a number of binary files.

Merging apparatus 208 may then use data files 222 and index files 224 in data repository 234 to process queries 240 of data from inputs 202. More specifically, the merging apparatus may combine records with the same entity and/or partition keys 230 from data repository 234 into a single merged record containing the keys and a single field containing a list of attribute-value pairs 232 from the records. For example, the entity and partition keys may be included at the top of the merged record, and the remainder of the merged record may include a single "metrics" field containing a sorted or unsorted list of attribute-value pairs from the corresponding processed records 218.

Merging apparatus 208 may then output the merged records in response to the queries. For example, the merging apparatus may return the merged records in responses to the queries, load the merged records in memory, and/or otherwise provide the merged records for use by users. Because the merged records can be generated in an on-demand basis (e.g., after the corresponding queries are received), the system of FIG. 2 may reduce the number of files and/or amount of storage required to produce the merged records over data-processing systems that materialize merged records from all inputs for subsequent querying or use by users.

During on-demand merging of the records, merging apparatus 208 may apply one or more filters 216 to keys 230 and/or attribute-value pairs 232. For example, the merging apparatus may obtain a list of inputs, a list of entity keys, and/or a partition key range (e.g., date range) from parameters 206 and/or queries 240. The merging apparatus may retrieve records matching the inputs, entity keys, and partition key range from data files 222 in data repository 234 and generate merged records with the same entity and partition keys from the retrieved records. In another example, merging apparatus 208 may obtain a whitelist of attributes to be included in the merged records and exclude attribute-value pairs with attributes not on the whitelist from the merged records.

Consequently, merging apparatus 208 may customize the merged records to the needs of different users, statistical models, and/or analytics applications. For example, the merging apparatus may generate one set of merged records containing a large number of attribute-value pairs 232 for a relatively small number of entity keys for training of a statistical model. The merging apparatus may also generate a separate set of merged records containing a smaller number of attribute-value pairs for a much larger number of entity keys for scoring using the statistical model. Each set of merged records may then be used with the statistical model without performing additional filtering of the attribute-value pairs. Moreover, generation of each set of merged records may be unaffected by delays or issues with input data sets that are not used to generate the merged records, and sets of merged records may be added or removed without affecting the generation of other sets of merged records by merging apparatus 208.

Those skilled in the art will appreciate that the system of FIG. 2 may be implemented in a variety of ways. First, data repository 234, processing apparatus 204, and merging apparatus 208 may be provided by a single physical machine, multiple computer systems, one or more virtual machines, a grid, one or more databases, one or more filesystems, and/or a cloud computing system. Processing apparatus 204 and merging apparatus 208 may additionally be implemented together and/or separately by one or more hardware and/or software components and/or layers. As described in further detail below with respect to FIG. 3, merging apparatus 208 may be implemented using a dynamic number of mappers that are mapped to different entity key and partition key ranges in processed records 218.

Second, merged records may be generated from records 212-214 in a number of ways. As mentioned above, the merged records may include some or all attribute-value pairs 232 for a given combination of entity and partition keys 230 from inputs 202. The system of FIG. 2 may thus include functionality to produce, based on parameters 206 and/or queries 240, multiple versions of merged records from different subsets of records 212-214 and/or attribute-value pairs 232 for the same entity key and partition key.

Attribute-value pairs 232 may further be grouped and consolidated into merged records according to different keys 230 or sets of keys. For example, all attribute-value pairs 232 associated with a given entity key may be listed under a single merged record for the entity key by merging apparatus 208. Within the merged record, each element in the list may be represented by an attribute name and/or identifier for an attribute, followed by a set of tuples that each contain a partition key (e.g., date key) and a corresponding value of the attribute for the given partition key. Consequently, the merged record may contain a full history of attribute-value pairs for the entity represented by the entity key.

Figure 3:
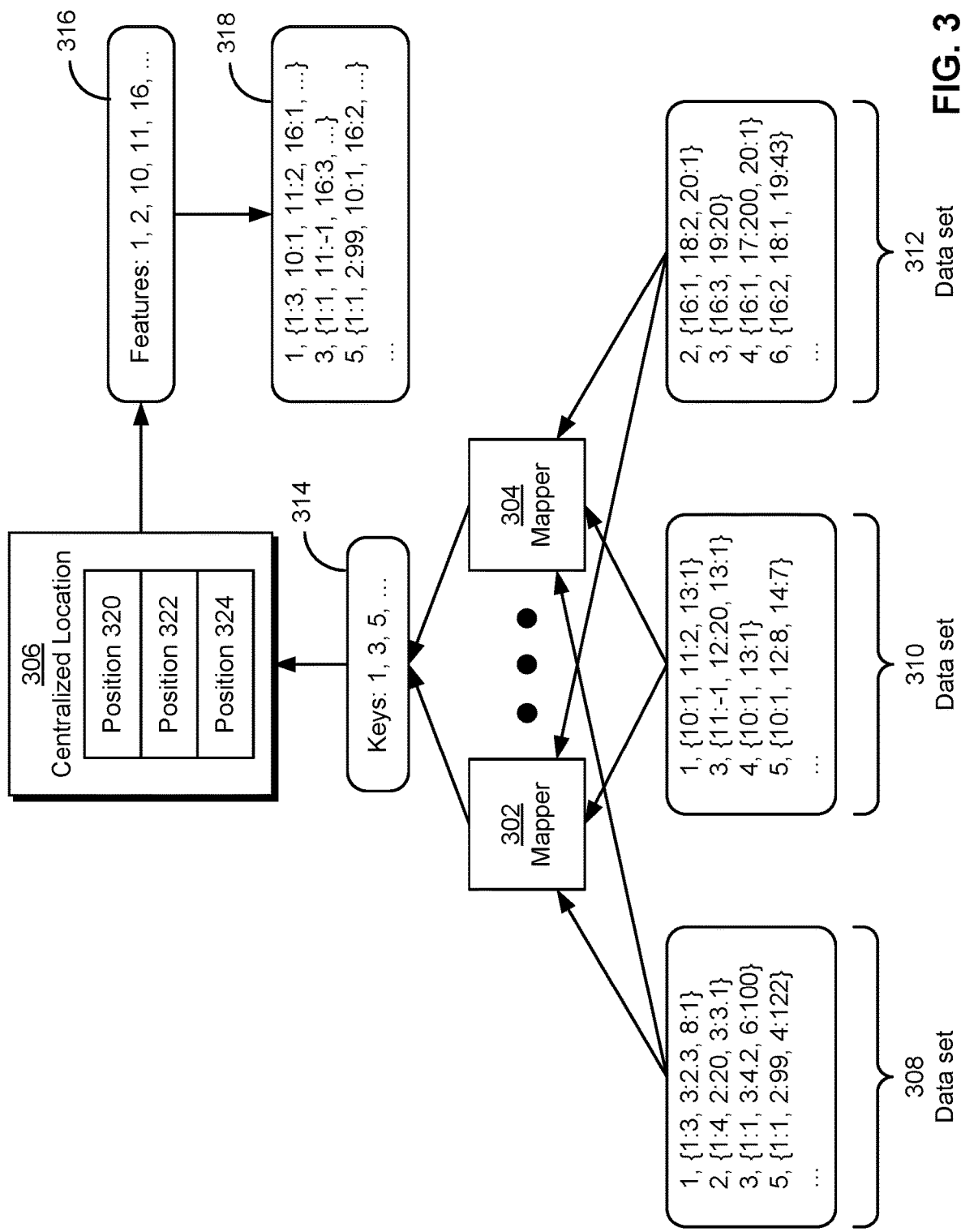
FIG. 3 shows an exemplary merging of data sets into a set of merged records in accordance with the disclosed embodiments.

FIG. 3 shows an exemplary merging of data sets 308-312 into a set of merged records 318 in accordance with the disclosed embodiments. Each data set may include a collection of metrics, dimensions, and/or other types of data from an input source. For example, the data sets may be generated by statistical models, telemetry systems, sensors, applications, users, and/or other sources of raw data, statistics, and/or input data.

Data sets 308-312 may be obtained from one or more data repositories, such as data repository 234 of FIG. 2. As a result, each data set may include a data file storing a set of processed records that is sorted by entity key and partitioned by partition key. For example, the processed records may be sorted in ascending order of partition key, and each data set may contain processed records that span a given partition key range (e.g., time interval). The data set may also include an index file (not shown) that maps entity keys in the data set to locations or offsets of the corresponding records in the data file, thereby enabling constant-time retrieval of records from the data file.

Within the data set, each processed record may include the entity key and a list of attribute-value pairs associated with the entity key. As shown in FIG. 3, the first four records of data set 308 have entity keys of 1, 2, 3, and 5; the first four records of data set 310 have entity keys of 1, 3, 4, and 5; and the first four records of data set 312 have entity keys of 2, 3, 4 and 6.

In data set 308, the record having an entity key of 1 includes three attribute-value pairs of 1 and 3, 3 and 2.3, and 8 and 1; the record having an entity key of 2 includes three attribute-value pairs of 1 and 4, 2 and 20, and 3 and 3.1; the record having an entity key of 3 includes three attribute-value pairs of 1 and 1, 3 and 4.2, and 6 and 100; and the record having an entity key of 5 includes three attribute-value pairs of 1 and 1, 2 and 99, and 4 and 122.

In data set 310, the record with an entity key of 1 includes three attribute-value pairs of 10 and 1, 11 and 2, and 13 and 1; the record with an entity key of 3 includes three attribute-value pairs of 11 and −1, 12 and 20, and 13 and 1; the record with an entity key of 4 includes two attribute-value pairs of 10 and 1 and 13 and 1; and the record with an entity key of 5 includes three attribute-value pairs of 10 and 1, 12 and 8, and 14 and 7.

In data set 312, record having an the entity key of 2 includes three attribute-value pairs of 16 and 1, 18 and 2, and 20 and 1; the record having an entity key of 3 includes two attribute-value pairs of 16 and 3 and 19 and 20; the record having an entity key of 4 includes three attribute-value pairs of 16 and 1, 17 and 200, and 20 and 1; and record having an the entity key of 6 includes three attribute-value pairs of 16 and 2, 18 and 1, and 19 and 43.

To reduce the amount of space required to store data sets 308-312, attributes in the attribute-value pairs may be stored as numeric identifiers for namespaced attribute names, and attribute-value pairs with non-meaningful values may be omitted from the records.

Data sets 308-312 may be identified in one or more parameters (e.g., parameters 206 of FIG. 2) associated with a query and/or API call to a data-processing system, such as the data-processing system of FIG. 2. For example, the API call may specify a path containing the data sets and the names of the data sets. The API call may also include a partition key range containing a starting and ending partition key for the data sets, such as a start date and end date for records in the data sets. The API call may further specify a list of entity keys 314 and/or a whitelist of features 316 to be included in merged records 318. Finally, the API call may indicate a number of mappers (e.g., mappers 302-304) to be used in generating the merged records from the data sets.

After a query, API call, and/or other trigger for generating merged records 318 is generated, mappers 302-304 may be used to merge records from data sets 308-312 into the merged records. As mentioned above, the number of mappers to be used may optionally be specified in the trigger. Each mapper may execute in a separate hardware and/or software module and operate on a different subset of records in data sets 308-312. For example, the trigger may specify a number of mappers per day of data from the data repository and some or all of the entity keys to be included in the merged records. In turn, the specified entity keys may be divided substantially equally among the mappers, such that each mapper is responsible for processing a subset of entity keys (e.g., a numeric range of entity keys) within a given partition key range (e.g., a data set containing one day's worth of data from the corresponding input).

To generate merged records 318 from data sets 308-312, mappers 302-304 may operate in parallel on the corresponding assigned entity keys. More specifically, the mappers may load records from the data sets into a centralized location 306 with a fixed number of positions 320-324, such as a min heap with a number of nodes that matches the number of data sets to be merged. The records may be loaded in ascending order of entity key into the centralized location by the mappers; after a given record is "pushed" into an position in the centralized location, the record may be "pulled" from the position by the same mapper and/or a merging mechanism. One or more features (e.g., features 316) from the record may then be included in the corresponding merged record (e.g., merged records 318). After a given record is pulled from the centralized location, the corresponding mapper may push the next record with an entity key in list 314 from the same data set into the centralized location.

As illustrated in FIG. 3, mappers 302-304 may use the list of entity keys 314 to identify entity keys of 1, 3, and 5 for inclusion in merged records 318. To produce the merged records, the mappers may first load records with an entity key of 1 from data sets 308 and 310 into centralized location 306. The mappers may then pull the records from the centralized location and apply the whitelist of features 316 to the records to generate a first merged record with an entity key of 1 and attribute-value pairs of 1 and 3, 10 and 1, 11 and 2, and 16 and 1.

After a given record is pulled from centralized location 306, the corresponding mapper may push the next record into the centralized location. Because the next entity key in the list of entity keys 314 is 3, mappers 302-304 may skip loading of records with entity keys of 2 into the centralized location. Instead, the mappers may load records with entity keys of 3 from data sets 308, 310 and 312 into positions 320, 322, and 324 of the centralized location. Because data set 312 does not include a record with an entity key of 1, the first record to be pushed into the centralized location from data set 312 will have an entity key of 3. The mappers may subsequently pull the records from the centralized location and apply whitelist 316 to produce a second merged record with an entity key of 3 and attribute-value pairs of 1 and 1, 11 and −1, and 16 and 3.

After a record with an entity key of 3 is pulled from centralized location 306, the corresponding mapper may push the next record with an entity key in list 314 into the centralized location. As a result, records with an entity key of 5 may be pushed from data sets 308 and 310 into the centralized location, and records with an entity key of 4 (e.g., from data sets 310 and 312) may be skipped by mappers 302-304. The mappers may then pull the records from the centralized location and apply whitelist 316 to produce a third merged record with an entity key of 5 and attribute-value pairs of 1 and 1, 2 and 99, 10 and 1, and 16 and 2.

Mappers 302-304 may continue processing data sets 308-312 by applying key-based filters during pushing of records into centralized location 306 and applying feature-based filters during pulling of records from the centralized location. After records with the last entity key in list 314 are pushed from one or more data sets into the centralized location, the records may be pulled from the centralized location, and the number of positions in the centralized location may decrease until all of the records with the last entity key have been merged into a final merged record.

Figure 4:
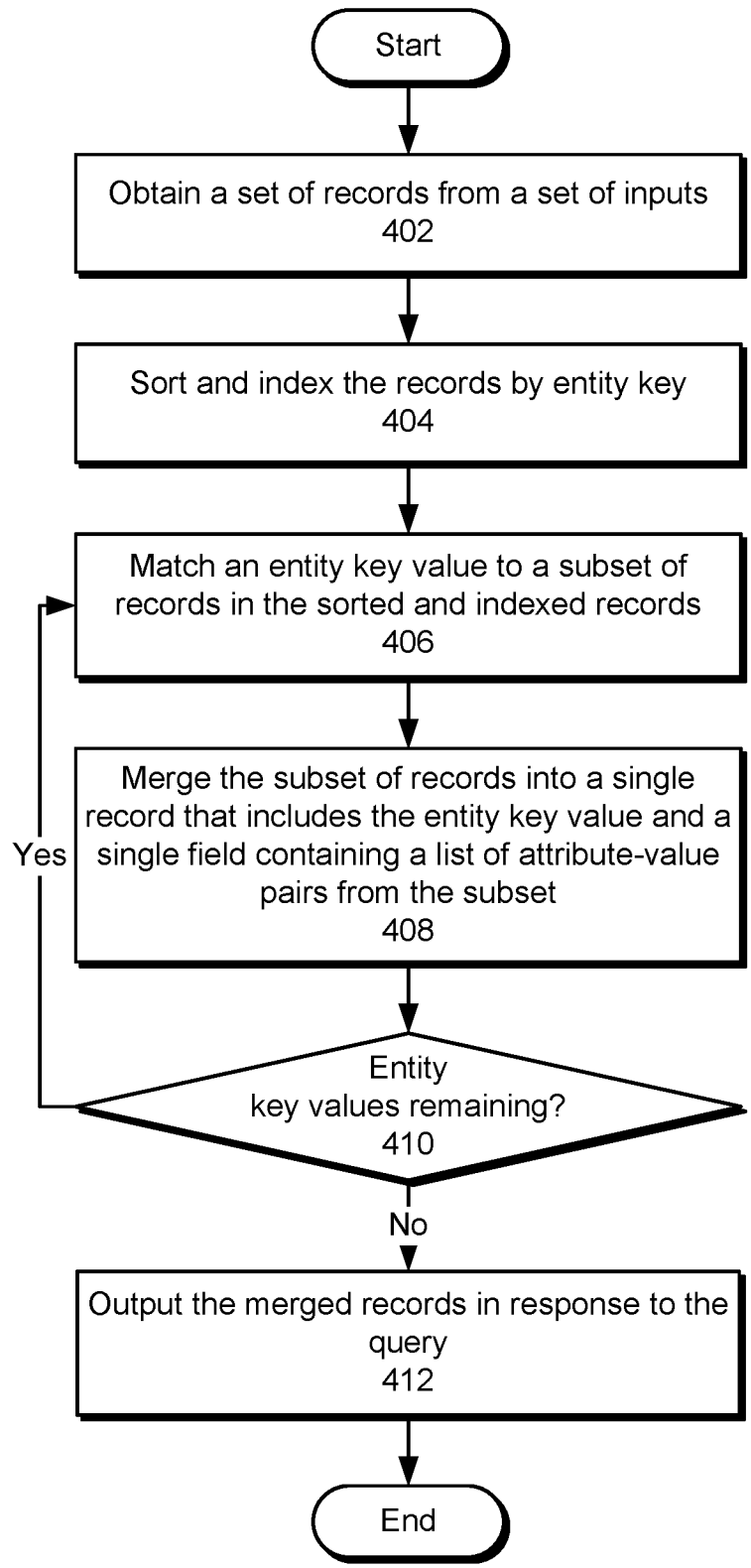
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, a set of records is obtained from a set of inputs (operation 402). The records may be identified and located using parameters from an API call, query and/or other trigger for generating merged records from the records. Next, the records are sorted and indexed by entity key (operation 404), as described in further detail below with respect to FIG. 5.

Next, an entity key value is matched to a subset of records in the sorted and indexed records (operation 406). For example, the entity value may be included in a list of entity keys to be retrieved using the query. As a result, the list may represent an optional filter for entity key values in the records. Alternatively, the list may include all possible entity key values in the records. The subset of records is then merged into a single record that includes the entity key value and a single field containing a list of attribute-value pairs from the subset (operation 408), as described in further detail below with respect to FIG. 6. Operations 406-408 may be repeated for remaining entity key values (operation 410) in the list and/or filter. After merged records have been generated for all entity key values, the merged records are outputted in response to the query (operation 412). For example, the merged records may be returned in a response to the query, loaded into memory, and/or otherwise provided for use in training statistical models, scoring using statistical models, and/or other types of data analysis or processing.

Figure 5:
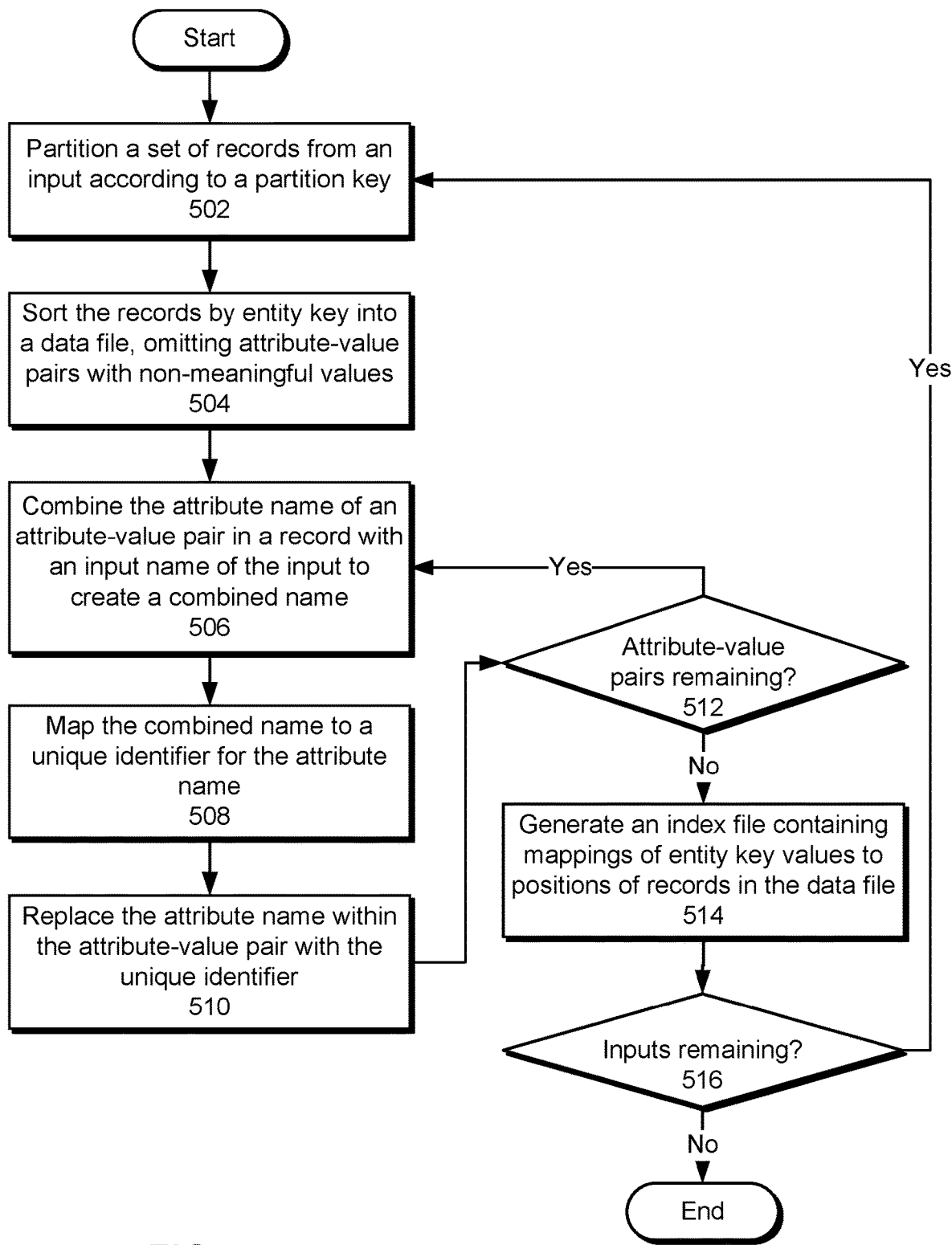
FIG. 5 shows a flowchart illustrating the process of sorting and indexing a set of records from a set of inputs in accordance with the disclosed embodiments.

FIG. 5 shows a flowchart illustrating the process of sorting and indexing a set of records from a set of inputs in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, a set of records from an input is partitioned according to a partition key (operation 502) associated with the records. For example, the records may be stored in different data files or data sets, with each data file or data set representing a different time range (e.g., hour, day, week, etc.) associated with data in the records. Next, the records are sorted by entity key into a data file, and attribute-value pairs with non-meaningful values are omitted from the data file (operation 504). For example, the records may be sorted in ascending order of entity key in the data file, and attribute-value pairs with null values, zero numeric values, and/or default values may be removed or omitted from the data file.

The attribute name of an attribute-value pair is also combined with an input name of the input to create a combined name (operation 506) that represents a unique, namespaced attribute name for the attribute. The combined name is also mapped to a unique identifier for the attribute name (operation 508), and the attribute name in the attribute-value pair is replaced with the unique identifier (operation 510). For example, the attribute name may be mapped to a numeric (e.g., integer) identifier, and the mapping may be stored in a file, table, list, and/or other type of structure for subsequent retrieval and use. The identifier may then be used in lieu of the longer attribute name in the attribute-value pair to reduce the amount of space required to store the attribute-value pair. If a mapping of the attribute name to the identifier already exists in the structure, the mapping may be retrieved from the structure, and the identifier in the mapping may be substituted for the attribute name in the attribute-value pair to reduce the storage requirements associated with the attribute-value pair. Operations 506-510 may be repeated for remaining attribute-value pairs (operation 512) in the records from the input.

An index file containing mappings of entity key values to positions of records in the data file is then generated (operation 514). For example, the index file may include entity key values in periodic intervals that are mapped to the offsets of the corresponding records in the data file. As a result, the index file may be used to perform constant-time lookup of processed records from the input.

The sorting and indexing of records in operations 502-514 may be repeated for records from remaining inputs (operation 516). For example, sorting and indexing of records may be performed for all data sets and/or inputs specified in a query of the records. The sorted and indexed records may then be combined to produce merged records that are returned in response to the query, as described below with respect to FIG. 6.

Figure 6:
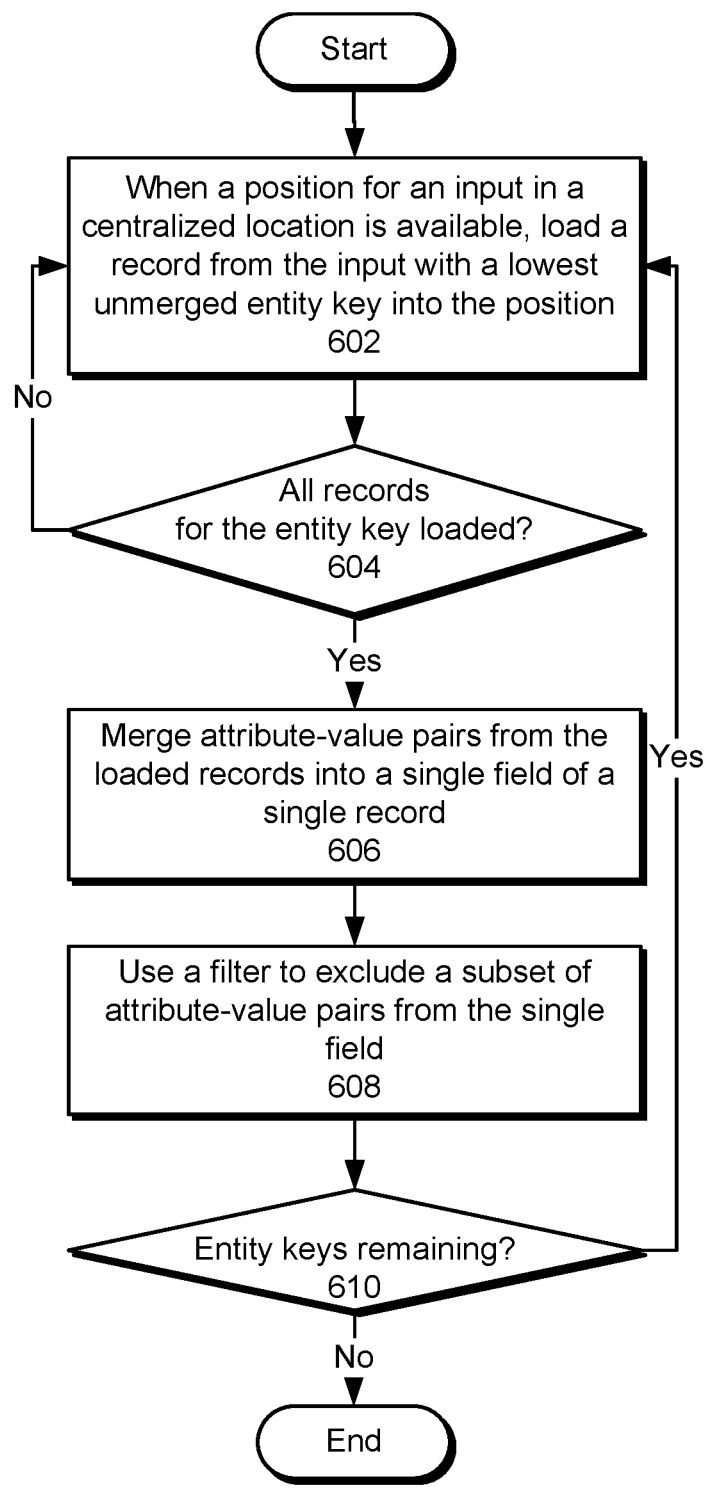
FIG. 6 shows a flowchart illustrating the process of merging records from a set of inputs in accordance with the disclosed embodiments.

FIG. 6 shows a flowchart illustrating the process of merging records from a set of inputs in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

During the merging process, a record from an input with a lowest unmerged entity key is loaded into a position for the input in a centralized location when the position is available (operation 602). For example, the merging process may begin with loading records with the lowest entity key from a list of entity keys into a min heap. Loading of records into the centralized location may continue until all records for the entity key are loaded (operation 604) into the centralized location.

Next, attribute-value pairs from the loaded records are merged into a single field of a single record (operation 606), and a filter is used to exclude a subset of attribute-value pairs from the single field (operation 608). For example, the single record may include the entity key, a partition key associated with the loaded records, and attribute-value pairs from the loaded records that match a whitelist of features.

Operations 602-608 may be repeated for remaining entity keys (operation 610) in the inputs and/or list of entity keys. More specifically, after a record is merged into the single record from the centralized location, the position for the corresponding input in the centralized location may become available, and the record with the next entity key is loaded into the position (operation 602). Loading of records with the same entity key from other inputs may also be performed until all records for the entity key are loaded (operation 604) into the centralized location. The attribute-value pairs from the loaded records may then be filtered and merged into a single field of the single record (operations 606-608). Such loading and merging of records may continue until merged records have been generated for all entity keys in the inputs and/or list.

Figure 7:
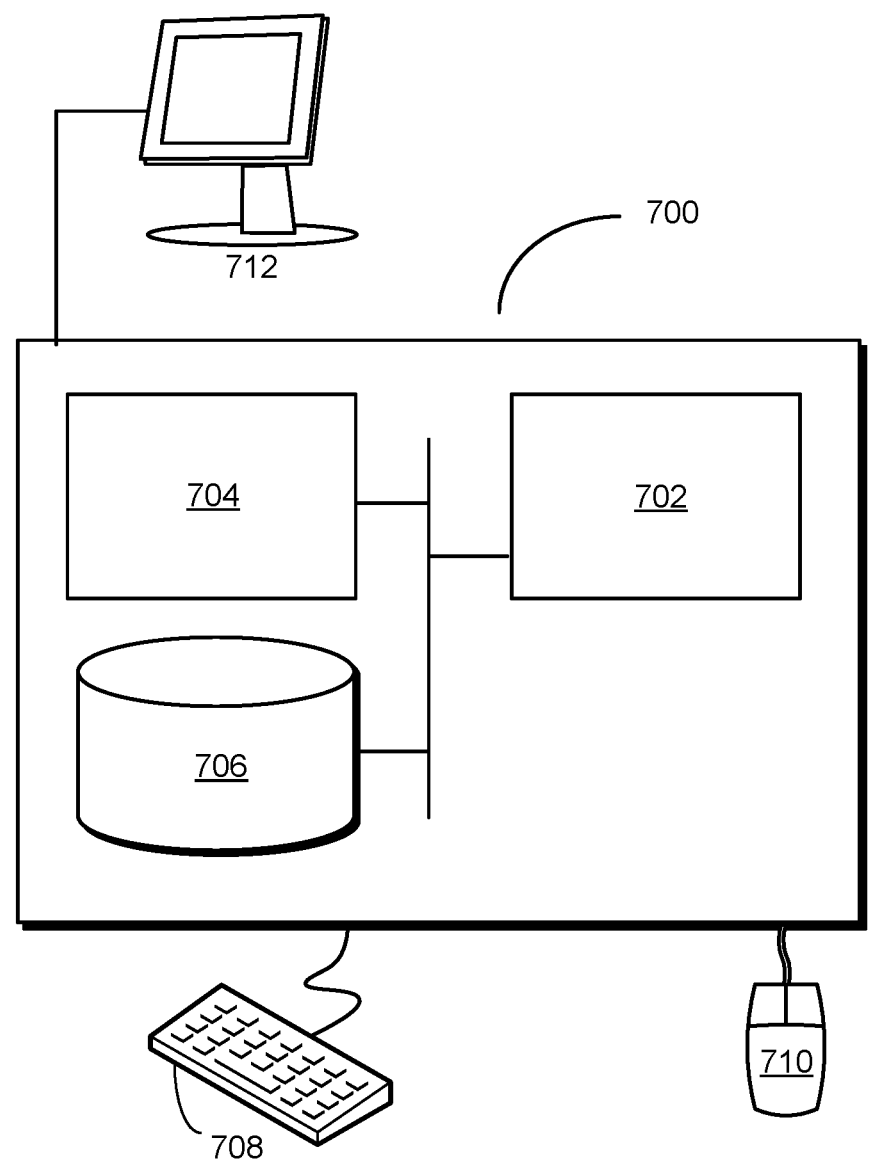
FIG. 7 shows a computer system in accordance with the disclosed embodiments.

FIG. 7 shows a computer system 700. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 processes data. The system may include a processing apparatus that obtains a set of records from a set of inputs, with each record containing an entity key, a partition key, and one or more attribute-value pairs. Next, the processing apparatus may sort and index the records by the entity key for each partitioned input. The system may also include a merging apparatus that processes a query of the records by matching entity key values to the sorted and indexed records for each input partition in the query. Next, the merging apparatus may merge the subset of records with the same entity key values into records, with each merged record containing an entity key field and a single field that includes a list of attribute-value pairs from the subset. Finally, the merging apparatus may output the merged records in response to the query.

In addition, one or more components of computer system 700 may be remotely located and connected to the other components over a network. Portions of the present embodiments (e.g., processing apparatus, merging apparatus, inputs, data repository, etc.) may also be located on different nodes of a distributed system that implements the embodiments. For example, the present embodiments may be implemented using a cloud computing system that consolidates metrics, dimensions, and/or other attribute-value pairs from records in a set of inputs for use in querying and subsequent processing by a set of remote users and/or electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a set of records from a set of inputs, wherein each record of the set of records comprises an entity key, a partition key, and one or more attribute-value pairs;
   sorting and indexing the set of records by the entity key; and
   processing, by one or more computer systems, a query of the records by:
      determining a plurality of mappers, a number of mappers in the plurality of mappers based on at least one of the query and the set of inputs;
      matching a first entity key value of the query to a first subset of records in the sorted and indexed records, wherein each record in the first subset of records includes an entity key that matches the first entity key value;
      merging the first subset of records into a first single record that comprises the first entity key value and a single field comprising a list of attribute value pairs from the first subset;
      wherein merging the first subset of records includes:
         loading, by the plurality of mappers, the first subset of records from one or more of the inputs into a first set of positions of a centralized location having a number of positions that corresponds to a number of inputs in the set of inputs;
         skipping loading records of the set of records that are not in the first subset of records;
         pulling the first subset of records from the first set of positions of the centralized location;
         wherein said pulling comprises filtering the first subset of records to obtain a filtered list of attribute-value pairs by removing, from the list of attribute-value pairs, one or more attribute-value pairs, each of the one or more attribute-value pairs comprising one or more of a null value, a zero numeric value, or a default value;
      wherein the filtered list of attribute-value pairs comprises multiple attribute-value pairs; and
      merging the filtered list of attribute-value pairs into the single field of the first single record, wherein the single field of the first single record includes the multiple attribute-value pairs; and
      outputting the first single record in response to the query.

2. The method of claim 1, wherein the query is further processed by:
   matching a second entity key value to a second subset of records in the sorted and indexed records; and
   merging the second subset of records into a second single record that comprises the second entity key value.

3. The method of claim 2, wherein merging the second subset of records into the second single record comprises:
   when a record in the first subset of records is merged into the first single record from the centralized location, loading an additional record with the second entity key value from the same input as the record into the centralized location; and
   after all records in the second subset of records are loaded into the centralized location, merging the second subset of records into the second single record.

4. The method of claim 1, wherein sorting and indexing the set of records by the entity key comprises:
   for each input in the set of inputs:
      sorting a second subset of records from the input by the entity key into a data file; and
      generating an index file comprising mappings of entity key values to positions of records in the second subset in the data file.

5. The method of claim 4, wherein sorting and indexing the set of records by the entity key further comprises:
   partitioning the second subset of records into the data file according to the partition key.

6. The method of claim 4, wherein sorting and indexing the set of records by the entity key further comprises:
   for each attribute-value pair in the record:
      mapping an attribute name in the attribute-value pair to a unique identifier for the attribute name; and
      replacing the attribute name within the attribute-value pair with the unique identifier.

7. The method of claim 6, wherein sorting and indexing the set of records by the entity key further comprises:
   omitting the attribute-value pair from the data file when a value in the attribute-value pair matches a non-meaningful value.

8. The method of claim 1, wherein the one or more computer systems are mapped to one or more entity key ranges in the sorted and indexed records.

9. The method of claim 8, wherein the one or more computer systems are further mapped to one or more partition key ranges in the sorted and indexed records.

10. The method of claim 1, wherein the one or more attribute-value pairs corresponding to attributes which are excluded from a whitelist of attributes.

11. The method of claim 1, further comprising:
    executing, in parallel, the plurality of mappers that includes a first mapper and a second mapper;
    assigning the first mapper to a first set of records corresponding to a first range of entity keys;

generating, by the first mapper, one or more first merged records based on the first set of records;
assigning the second mapper to a second set of records corresponding to a second range of entity keys that is different than the first range of entity keys;
generating, by the second mapper, one or more second merged records based on the second set of records.

12. The method of claim 1, wherein the multiple attribute-value pairs comprise a first attribute and a second attribute that is different than the first attribute.

13. An apparatus, comprising:
one or more processors; and
memory storing instructions that, when executed by the one or more processors, cause the apparatus to:
obtain a set of records from a set of inputs, wherein each record of the set of records comprises an entity key, a partition key, and one or more attribute-value pairs;
sort and index the set of records by the entity key; and
process a query of the records by:
determining a plurality of mappers, a number of mappers in the plurality of mappers based on at least one of the query and the set of inputs;
matching a first entity key value of the query to a first subset of records in the sorted and indexed records, wherein each record in the first subset of records includes an entity key that matches the first entity key value;
merging the first subset of records into a first single record that comprises the first entity key value and a single field comprising a list of attribute value pairs from the first subset;
wherein merging the first subset of records includes:
loading, by the plurality of mappers, the first subset of records from one or more of the inputs into a first set of positions of a centralized location having a number of positions that corresponds to a number of inputs in the set of inputs;
skipping loading records of the set of records that are not in the first subset of records;
pulling the first subset of records from the first set of positions of the centralized location;
wherein said pulling comprises filtering the first subset of records to obtain a filtered list of attribute-value pairs by removing, from the list of attribute-value pairs, one or more attribute-value pairs, each of the one or more attribute-value pairs comprising one or more of a null value, a zero numeric value, or a default value;
wherein the filtered list of attribute-value pairs comprises multiple attribute-value pairs; and
merging the filtered list of attribute-value pairs into the single field of the first single record, wherein the single field of the first single record includes the multiple attribute-value pairs; and
outputting the first single record in response to the query.

14. The apparatus of claim 13, wherein the memory further stores instructions that, when executed by the one or more processors, cause the apparatus to:
match a second entity key value to a second subset of records in the sorted and indexed records; and
merge the second subset of records into a second single record that comprises the second entity key value.

15. The apparatus of claim 14, wherein merging the second subset of records into the second single record comprises:
when a record in the first subset of records is merged into the first single record from the centralized location, loading an additional record with the second entity key value from the same input as the record into the centralized location; and
after all records in the second subset of records are loaded into the centralized location, merging the second subset of records into the second single record.

16. The apparatus of claim 13, wherein sorting and indexing the set of records by the entity key comprises:
for each input in the multiple inputs:
sorting a second subset of records from the input by the entity key into a data file;
partitioning the second subset of records into the data file according to the partition key; and
generating an index file comprising mappings of entity key values to positions of records in the second subset in the data file.

17. The apparatus of claim 13, wherein the one or more attribute value pairs corresponding to attributes which are excluded from a whitelist of attributes.

18. A system, comprising:
a data-processing module comprising a non-transitory computer-readable medium comprising instructions that, when executed, cause the system to:
obtain a set of records from a set of inputs, wherein each record of the set of records comprises an entity key, a partition key, and one or more attribute-value pairs; and
sort and index the set of records by the entity key; and
a loading module comprising a non-transitory computer-readable medium comprising instructions that, when executed, cause the system to process a query of the records by:
determining a plurality of mappers, a number of mappers in the plurality of mappers based on at least one of the query and the set of inputs;
matching a first entity key value of the query to a first subset of records in the sorted and indexed records, wherein each record in the first subset of records includes an entity key that matches the first entity key value;
merging the first subset of records into a first single record that comprises the first entity key value and a single field comprising a list of attribute value pairs from the first subset;
wherein merging the first subset of records includes:
loading, by the plurality of mappers, the first subset of records from one or more of the inputs into a first set of positions of a centralized location having a number of positions that corresponds to a number of inputs in the set of inputs;
skipping loading records of the set of records that are not in the first subset of records;
pulling the first subset of records from the first set of positions of the centralized location;
wherein said pulling comprises filtering the first subset of records to obtain a filtered list of attribute-value pairs by removing, from the list of attribute-value pairs, one or more attribute-value pairs, each of the one or more attribute-value pairs comprising one or more of a null value, a zero numeric value, or a default value;
wherein the filtered list of attribute-value pairs comprises multiple attribute-value pairs; and
merging the filtered list of attribute-value pairs into the single field of the first single record, wherein the single field of the first single record includes the multiple attribute-value pairs; and outputting the first single record in response to the query.

19. The system of claim 18, wherein sorting and indexing the set of records by the entity key comprises:

for each input in the multiple inputs:

sorting a second subset of records from the input by the entity key into a data file;

partitioning the second subset of records into the data file according to the partition key; and generating an index file comprising mappings of entity key values to positions of records in the second subset in the data file.

20. The system of claim 18, wherein the one or more non-meaningful values include at least one of:

one or more null values;

one or more zero numeric values for numeric data types; or one or more other types of default values.

* * * * *